US011921462B2

(12) United States Patent
Caron

(10) Patent No.: US 11,921,462 B2
(45) Date of Patent: Mar. 5, 2024

(54) TIMEPIECE CALENDAR DEVICE

(71) Applicant: ROLEX SA, Geneva (CH)

(72) Inventor: Elvis Caron, Bons-en-Chablais (FR)

(73) Assignee: ROLEX SA, Geneva (CH)

( * ) Notice: Subject to any disclaimer, the term of this patent is extended or adjusted under 35 U.S.C. 154(b) by 1154 days.

(21) Appl. No.: 16/535,476

(22) Filed: Aug. 8, 2019

(65) Prior Publication Data

US 2020/0050152 A1 Feb. 13, 2020

(30) Foreign Application Priority Data

Aug. 9, 2018 (EP) .................................... 18188338

(51) Int. Cl.
*G04B 19/243* (2006.01)
*G04B 13/02* (2006.01)

(52) U.S. Cl.
CPC ......... *G04B 19/243* (2013.01); *G04B 13/027* (2013.01)

(58) Field of Classification Search
CPC .... G04B 19/243; G04B 13/027; G04B 19/24; G04B 19/25373
USPC .......................................................... 368/37
See application file for complete search history.

(56) References Cited

U.S. PATENT DOCUMENTS 3,735,582 A * 5/1973 Schneider .............. G04B 19/25 368/35
3,939,645 A * 2/1976 Charbonney .......... G04B 19/25 368/31
4,059,953 A * 11/1977 Morrison ......... G04B 19/25366 368/36
6,668,456 B1 * 12/2003 Moser .................... G04B 19/12 264/320
7,633,837 B2 12/2009 Daout
7,969,825 B2 6/2011 Daout
2007/0180943 A1 * 8/2007 Daout .................. G04B 13/027 74/457
2010/0043578 A1 2/2010 Daout
2010/0091617 A1 * 4/2010 Goeller .................. G04B 13/02 368/220
2012/0106301 A1 5/2012 Philippine
(Continued)

FOREIGN PATENT DOCUMENTS

AT 296892 B 2/1972
EP 1 555 584 A1 7/2005
(Continued)

OTHER PUBLICATIONS

European Search Report and Written Opinion dated Feb. 14, 2019 issued in counterpart application No. EP18188338; w/ English machine translation (15 pages).
(Continued)

*Primary Examiner* — Edwin A. Leon
*Assistant Examiner* — Kevin Andrew Johnston
(74) *Attorney, Agent, or Firm* — WHDA, LLP

(57) ABSTRACT

Timepiece calendar device (100)
including a first display disk (1) for displaying dates having a first face (11) bearing date indications (10) and mobile about an axis (A),
and a second display disk (2) for displaying days having a second face (21) bearing day indications (20) and mobile about the axis (A),
the first and second disks being such that the first and second faces are coplanar, the second face being disposed around the first face.

17 Claims, 4 Drawing Sheets

(56) References Cited

U.S. PATENT DOCUMENTS

| | | | | |
|---|---|---|---|---|
| 2012/0106302 | A1* | 5/2012 | Philippine .............. | G04B 19/25 368/37 |
| 2012/0127835 | A1* | 5/2012 | Dubugnon ....... | G04B 19/25353 368/37 |
| 2013/0170325 | A1* | 7/2013 | Suzuki ............... | G04B 19/2536 368/37 |
| 2016/0202664 | A1* | 7/2016 | Carreno ........... | G04B 19/25306 368/37 |

FOREIGN PATENT DOCUMENTS

| | | | | | |
|---|---|---|---|---|---|
| EP | 2 447 789 | A1 | | 5/2012 | |
| EP | 2813902 | A1 | * | 12/2014 | ......... G04B 19/2534 |
| FR | 1568274 | A | | 5/1969 | |
| FR | 2092738 | A1 | | 1/1972 | |
| WO | 2014/033510 | A1 | | 3/2014 | |
| WO | WO-2014033510 | A1 | * | 3/2014 | ....... G04B 19/25373 |

OTHER PUBLICATIONS

Office Action dated Mar. 22, 2021, issued in the counterpart EP Application No. 18188338.0. (4 pages).

* cited by examiner

TIMEPIECE CALENDAR DEVICE

This application claims priority of European patent application No. EP18188338.0 filed Aug. 9, 2018, the content of which is hereby incorporated by reference herein in its entirety.

The invention concerns a timepiece calendar device. It further concerns a timepiece movement including a timepiece calendar device of this kind. It finally concerns a timepiece, in particular a wristwatch, including a timepiece calendar device of this kind or a movement of this kind.

Known for example is the Rolex 3255 movement which includes a calendar device adapted to display an indication of the day of the week and an indication of the date. A day indicator is disposed at the exterior periphery of a date indicator, so as to indicate the days in full. An arrangement of this kind requires superposition of the day and date indicators in two distinct planes. To this end the disk bearing the day indications includes windows in which the date indication may appear. A solution of this kind is very easy to read but there is a small axial offset of the day and date indications.

Also known is the ETA 2836 movement which also includes a calendar device adapted to display an indication of the day of the week and an indication of the date. The day and date indicators are disposed in one and the same plane. A disposition of this kind is nevertheless made possible by the fact that the day indicator is disposed at the interior periphery of the date indicator. A solution of this kind is not the optimum in that it is not able to provide an indication of the days in full because of the too small surface area of the day indicator, which explains the fact that here the day indication is abbreviated. Moreover, the day indication is duplicated, which can make adjustment of the day indication somewhat unergonomic.

The object of the invention is to provide a calendar device enabling improvement of the known prior art calendar devices. In particular, the invention proposes a calendar device in which the day indications in full and the date indications are easy to read and in which the quality of the display as perceived by the user is enhanced.

A calendar device according to the invention is defined by point 1 below.

1. A timepiece calendar device including:
   - a first disk for displaying dates, the first disk having a first face bearing date indications and being mobile about an axis, and
   - a second disk for displaying days, the second disk having a second face bearing day indications and being mobile about the axis,
   - the first and second disks being such that the first and second faces are coplanar, the second face being disposed around the first face.

Various embodiments of the calendar device are defined by dependent points 2 to 12 below.

2. The device as defined in the preceding point, including a calendar driver mobile including a first finger for driving a first set of teeth of the first disk, notably for driving directly through contact with the first set of teeth of the first disk, and a second finger for driving a second set of teeth of the second disk, in particular for driving via a kinematic chain of the second set of teeth of the second disk.
3. The device as defined in the preceding point, wherein the second set of teeth is an interior set of teeth and the first set of teeth is an interior set of teeth, the second set of teeth having a tip diameter d2 greater than the tip diameter d1 of the first set of teeth, in particular $d2>1.1\times d1$ or $d2=1.2\times d1$.
4. The device as defined in point 2 or 3, wherein the second disk has a shape staggered across two distinct levels, day indications being disposed in a first plane, and the second set of teeth is integrally formed with a plate an upper surface of which lies in a second plane parallel to the first plane.
5. The device as defined in the preceding point, wherein the distance between the first and second planes is equal or substantial equal to the thickness of the first disk, in particular the distance between the first and second planes being in the range [0.1 mm; 0.3 mm] or in the range [0.15 mm; 0.25 mm].
6. The device as defined in any one of points 2 to 5, wherein the kinematic chain includes a day mobile and an intermediate mobile meshing with one another, the intermediate mobile meshing with the second set of teeth of the second disk.
7. The device as defined in the preceding point, wherein the modulus of the teeth procuring meshing of the day mobile and the intermediate mobile is configured so as to minimize the angular play between the day mobile and the intermediate mobile, in particular is less than or equal to 0.5 or is less than or equal to 0.3 or is less than or equal to 0.2 or is in the range [0.07; 0.2], and/or the modulus of the set of teeth through which the intermediate mobile and the second disk mesh is configured so as to minimize the angular play between the intermediate mobile and the second disk, in particular is less than or equal to 0.5 or is less than or equal to 0.3 or is less than or equal to 0.2 or is in the range [0.07; 0.2].
8. The device as defined in points 6 or 7, wherein the day mobile and/or the intermediate mobile is/are of the play compensation type and/or at least one of the sets of teeth through which the intermediate mobile and the second disk mesh is of the play compensation type, in particular with elastic teeth, and/or at least one of the sets of teeth through which the day mobile and the intermediate mobile mesh is of the play compensation type, in particular with elastic teeth.
9. The device as defined in any one of the preceding points, wherein the first disk is indexed in position by a first jumper, in particular a first jumper cooperating with the first set of teeth of the first disk, and/or wherein the second disk is indexed in position by a second jumper, in particular a second jumper cooperating with a day mobile kinematically connected to the second disk.
10. The device as defined in any one of the preceding points, including a calendar bridge and a calendar circle and wherein an axial shake of the first disk is defined by the calendar bridge and the calendar circle, in particular by a first bearing surface of the calendar bridge, and/or an axial shake of the second disk is defined by calendar keys disposed on the calendar circle and by a second bearing surface of the calendar circle.
11. The device as defined in any one of the preceding points, including a correction mechanism including a mobile adapted:
    - to actuate the first date disk when a correction stem of a timepiece movement or timepiece is actuated in a first rotation direction, and to actuate the second day disk when the correction stem of timepiece movement or timepiece is actuated in a second rotation direction.

12. The device as defined in the preceding point, wherein the mobile includes:
    - a star adapted to actuate directly the first set of teeth of the first disk, and
    - a wheel adapted to actuate the second disk via a kinematic chain.

A timepiece movement according to the invention is defined by point 13 below.

13. A timepiece movement including a calendar device as claimed in any one of the preceding points.

A timepiece according to the invention is defined by point 14 below.

14. A timepiece, in particular a wristwatch, including a timepiece movement as defined in the preceding point and/or a calendar device as defined in any one of points 1 to 12.

The appended figures represent by way of example one embodiment of a timepiece.

Figure 1:
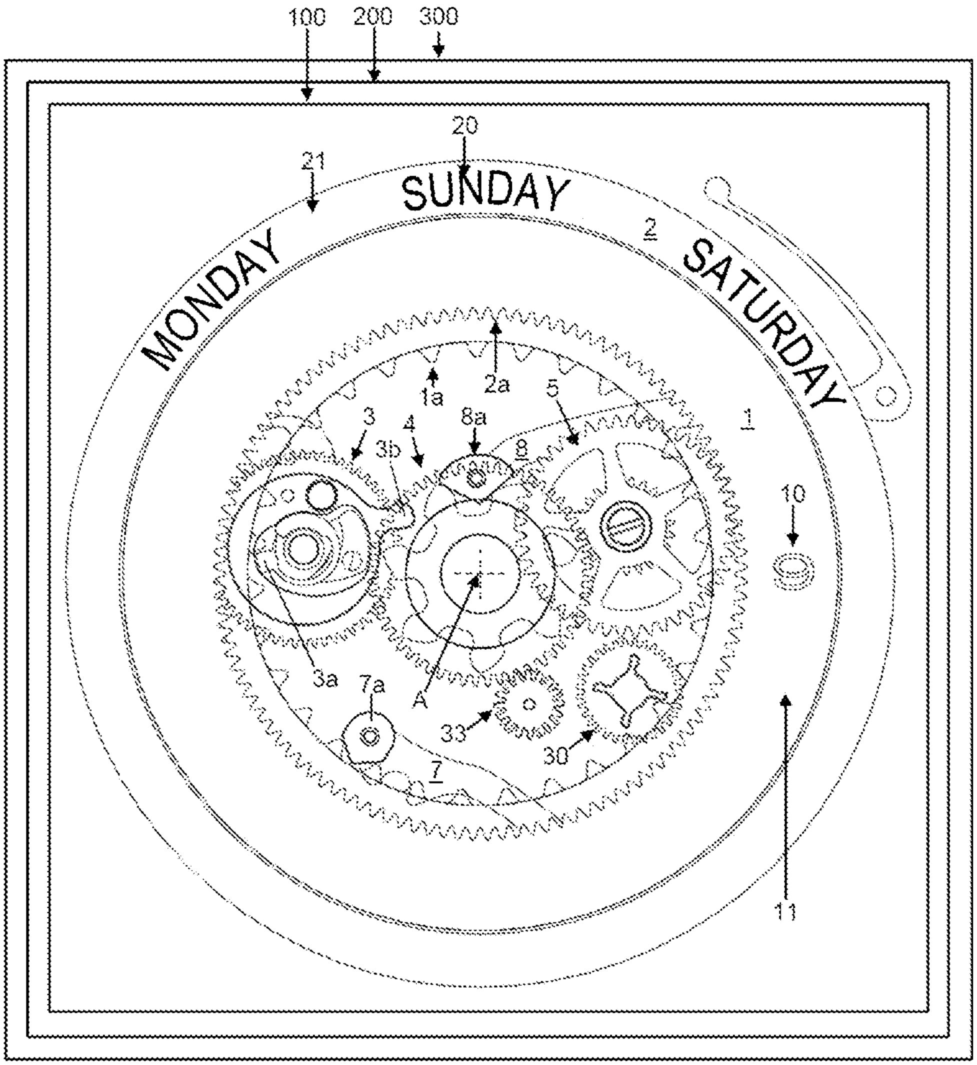
FIG. 1 is a view of one embodiment of a timepiece.

One embodiment of a timepiece 300 is described hereinafter with reference to FIGS. 1 to 7. The timepiece is for example a watch or a wristwatch. The timepiece includes a timepiece movement, for example an electronic or mechanical movement 200, in particular an automatic timepiece movement. The timepiece may further include a timepiece assembly, in particular a watch case intended to contain the movement.

The timepiece movement includes a calendar device 100. The timepiece calendar device includes:

- a first disk 1 for displaying dates, the first disk having a first face 11 bearing date indications 10 and being mobile about an axis A, and
- a second disk 2 for displaying days, the second disk having a second face 21 bearing day indications 20 and being mobile about the axis A.

The first and second disks are such that the first and second faces are coplanar. In other words, the date indicators or indications and the day indicators or indications are in the same plane or substantially the same plane. The first and second disks are also configured so that the second face is disposed around and outside the first face. In other words, the first face includes at least one first disk ring and the second face includes at least one second disk ring surrounding the first disk ring outside that first ring.

By "coplanar faces" we mean that the distance between the two faces or the distance measured along the axis A between two planes passing through the two faces is less than or equal to 80 μm or even less than or equal to 60 μm or even less than or equal to 40 μm.

The calendar device includes at least one first date indicator 10 that is disposed on the first disk 1. The at least one first indicator preferably includes 31 first indications. Those indications are for example numbers, in particular from 1 to 31, and are preferably disposed at a regular angular interval on the first disk around the axis A. The at least one first indicator is advantageously disposed on the first face of the first disk. The at least one first indicator may be engraved and/or pad printed on the first disk.

The calendar device includes at least one second indicator 20 of the days that is disposed on the second disk 2. The at least one second indicator preferably includes seven indications. Those seven indications are for example strings of characters, in particular strings of alphanumeric characters, in particular strings of alphabetic characters, in particular the names of the days of the week in one language or another, for example in French, in English, in Spanish, in German, in Russian, in Chinese or in Japanese. These second indications are preferably disposed at regular angular intervals on the second disk around the axis A. The at least one second indicator is advantageously disposed on the second face of the second disk. The at least one second indicator may be engraved and/or pad printed on the second disk.

The first disk 1 includes a first interior set of teeth **1*a* including 31 teeth. The first disk is angularly indexed by a beak 7*a* of a first jumper 7. This first jumper preferably cooperates with the first set of teeth 1*a* to index said disk. One of the teeth of the set of teeth 1*a* is adapted to be actuated every 24 hours by a first finger 3*a* of a calendar driver mobile 3 so as to enable driving of the first date disk 1** and therefore to enable updating of the date indication.

Figure 2:
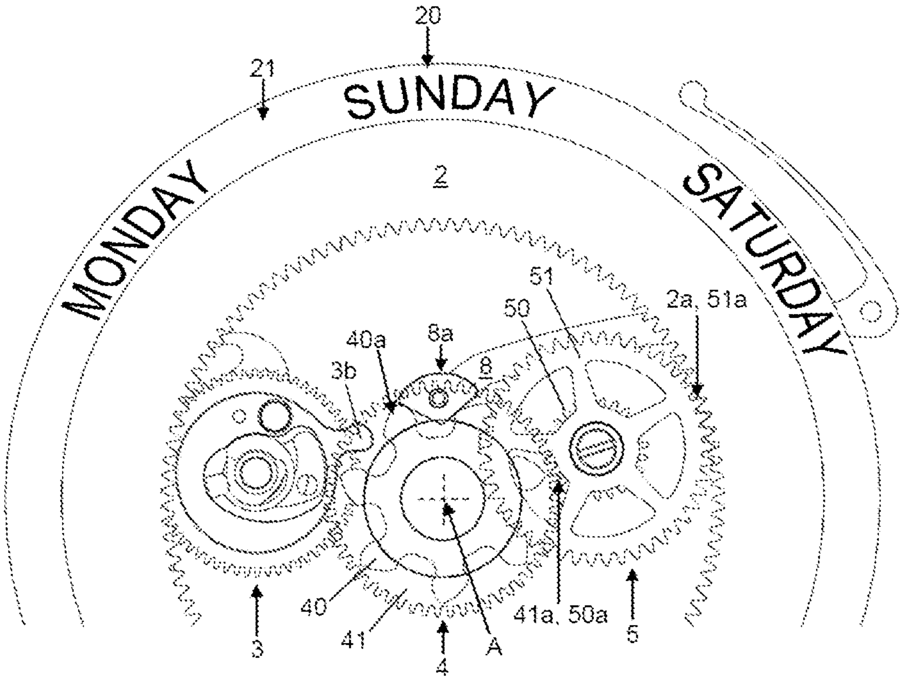
FIG. 2 is a view of one embodiment of the calendar with the date disk removed.

The calendar driver mobile 3 is also adapted to actuate a day mobile 4 that is kinematically connected to the second day disk 2. The day mobile 4 more particularly includes a first wheel 40 with an exterior set of teeth **40*a* including 7 teeth. The day mobile is angularly indexed by a beak 8*a* of a second jumper 8. One of the teeth of the set of teeth 40*a* is adapted to be actuated every 24 hours by a second finger 3*b* of the calendar driver mobile 3 so as to enable driving of the day disk 2 and therefore to enable updating of the day indication. To this end, the day mobile 4 includes a second wheel 41 constrained to rotate with the first wheel 40 which drives the day disk 2 via an intermediate mobile 5 as shown in FIG. 2. That intermediate mobile 5 includes a gear 50 with a set of teeth 50*a* adapted to mesh with the set of teeth 41*a* of the second wheel 41 and a wheel 51 with a set of teeth 51*a* adapted to drive a set of teeth 2*a* of the day disk 2**.

The day disk 2 is therefore separated from the day mobile 4 in order to establish a kinematic connection between these two elements. A design of this kind has the advantage of moving the day or second indicator to the exterior periphery of the date or first indicator whilst disposing the day or second indicator at the same level as the date or first indicator. The day or second indicator 20 is therefore disposed on the second disk 2, which has the specific feature of being actuated by a kinematic chain 4, 5 disposed between the calendar driver mobile 3 and the day disk 2.

The moduli of the sets of teeth **41*a*, 50*a*, 51*a*, 2*a* are advantageously designed to minimize as much as possible the angular play between the day mobile 4 and the day disk 2. To this end, the modulus m1 of the teeth 41*a*, 50*a* and the modulus m2 of the teeth 2*a*, 51*a* are less than 0.5, or even less than 0.3, or even less than 0.2. The moduli m1 and m2 may more particularly be between 0.07 and 0.2. As a corollary of this, the number z2 of teeth in the set of teeth 2*a*** is preferably between 30 and 240, in particular between 80 and 150.

In the embodiment shown, the set of teeth **2*a* has a modulus m2** of 0.15 and includes 112 teeth.

In a complementary manner, the angular play between the mobile 4 and the disk 2 may further be minimized by means of a mobile 4 and/or a mobile 5 and/or a disk 2 taking the form of a play compensation mobile such as that forming for example the subject matter of the patent application EP1555584A1. The teeth 40*a*, 41*a*, 51*a*, 2*a* could more particularly be provided in whole or in part with elastic play compensating teeth.

The second set of teeth 2*a* of the day disk 2 is preferably an interior set of teeth. A solution of this kind enables optimum simplification of the kinematic chain disposed between the driver mobile 3 and the disk 2 whilst minimizing the total diameter of the calendar mechanism.

The day disk 2 advantageously has a shape staggered across two distinct levels. The day indicator 20 is disposed on the second face 21 passing through a first plane P1 and the set of teeth 2*a* is integrally formed with a plate 2*b* the upper surface of which extends in a second plane P2 parallel to the first plane P1. The distance between the first and second planes is equal or substantially equal to the thickness of the first disk (measured parallel to the axis A). The distance between the first and second planes is preferably between 0.1 mm and 0.3 mm, or even between 0.15 mm and 0.25 mm. The second disk therefore has a section (in a plane passing through the axis A) of L-shape or of substantially L-shape.

The first date disk 1 is preferably flat. The first disk therefore has a section (in a plane passing through the axis A) that is rectangular or substantially rectangular.

The first date disk 1 is configured to be arranged between the plate 2*b* of the second day disk 2 and a calendar bridge 91 so that the first face 11 bearing at least a date indicator 10 is disposed in the same plane P1 as the second face 21 bearing the at least one day indicator 20.

Figure 3:
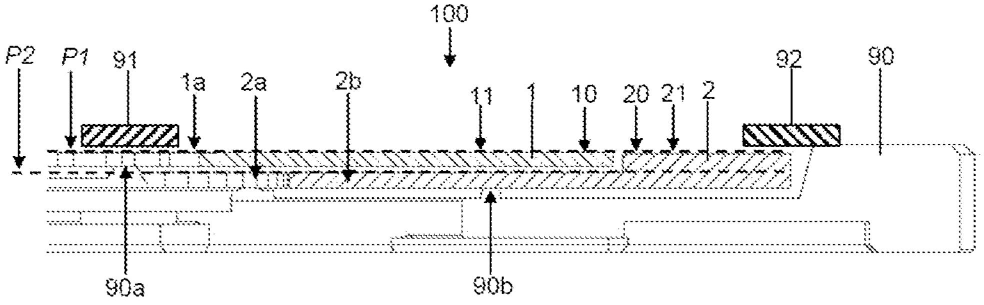
FIG. 3 is a view in partial section of the embodiment of the calendar.

FIG. 3 shows a view of the calendar device 100 in section in a plane passing through the axis A. The axial shake (along the axis A) of the first date disk 1 is advantageously defined by the calendar bridge 91 and a calendar circle 90, in particular a first bearing surface 90*a* of the calendar bridge. The axial shake (along the axis A) of the second day disk 2 is for its part defined by calendar keys 92 disposed on the calendar circle 90 and by a second bearing surface 90*b* of the calendar circle 90. The axial shake of the date disk can therefore be defined independently of the axial shake of the day disk and vice versa. Of course, any other element may be envisaged for participating in the definition of the respective axial shakes of the day and date disks. For example, the calendar bridge 91 may be replaced by calendar keys or by the dial of the timepiece integrating the calendar mechanism. In the same manner, the calendar keys 92 may be replaced by a calendar bridge or by the dial of the timepiece integrating the calendar mechanism.

Figure 4:
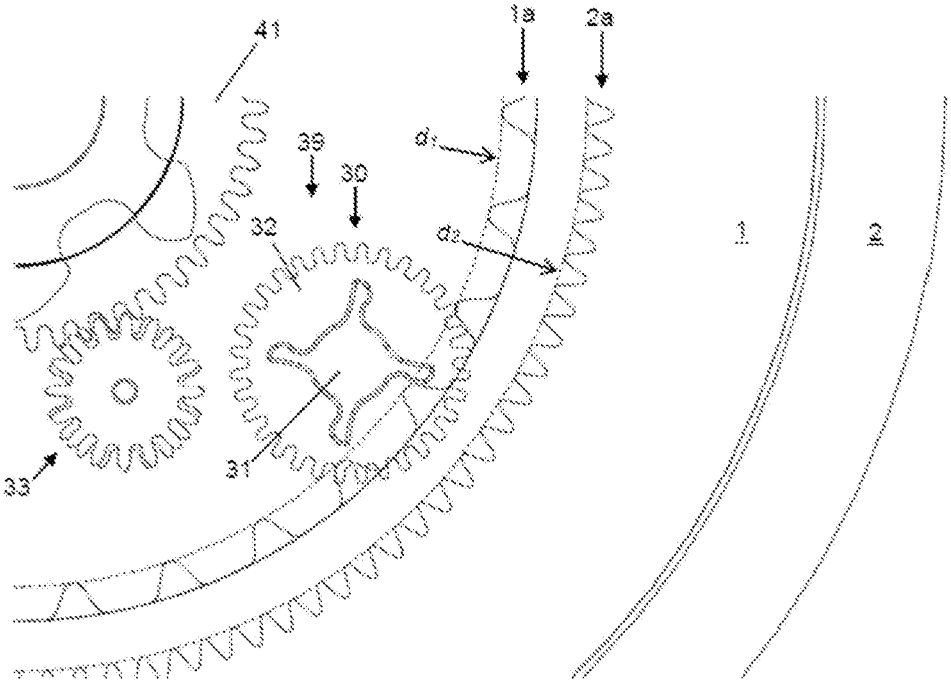
FIG. 4 is a detail view of a calendar correction device.

As shown in FIG. 4, the second set of teeth 2*a* of the day disk 2 has a tip diameter d2 strictly greater than the tip diameter d1 of the set of teeth 1*a* of the date disk 1. In fact, such dimensions enable implementation of a mechanism 39 for rapid correction of the calendar such as that shown in FIG. 4. This mechanism 39 for rapid correction of the calendar includes a correction mobile 30 disposed at least essentially inside the perimeter defined by the diameter d1. The correction mobile may in particular include a star 31 intersecting the plane P2 but adapted to actuate directly the set of teeth 1*a* of the first date disk 1 with no risk of interfering with the set of teeth 2*a* of the second day disk 2. To this end, the root diameter of the first set of teeth 1*a* is preferably less than the tip diameter d2 of the second set of teeth.

Preferably d2>d1 or d2>1.1×d1. In the embodiment shown d2 is equal or substantially equal to 1.2×d1.

The correction mobile 30 more preferably also includes a wheel 32 adapted to actuate the set of teeth 2*a* of the second disk 2 via the day mobile 4. The wheel 32 may more particularly be adapted to interengage with a mobile 33 meshing with the wheel 41 that is kinematically connected to the second disk 2.

The correction mobile 30 may therefore include:

- a star 31 adapted to actuate directly the first set of teeth 1*a* of the first disk 1, and
- a wheel 32 adapted to actuate the second disk 2 via the kinematic chain 4, 5.

According to one particular mode of operation of the correction mechanism 39 the mobile 30 may be adapted:

- to actuate the first date disk 1 when a correction stem is actuated in a first rotation direction, and
- to actuate the second day disk 2 when the correction stem is actuated in a second rotation direction opposite the first direction.

To this end, the mobile 30 can be moved in the plane of the calendar mechanism, that is to say in the plane P1 or in a plane parallel to the plane P1, by means known in the prior art, in particular the means described in the application EP2701014A1.

Figure 5:
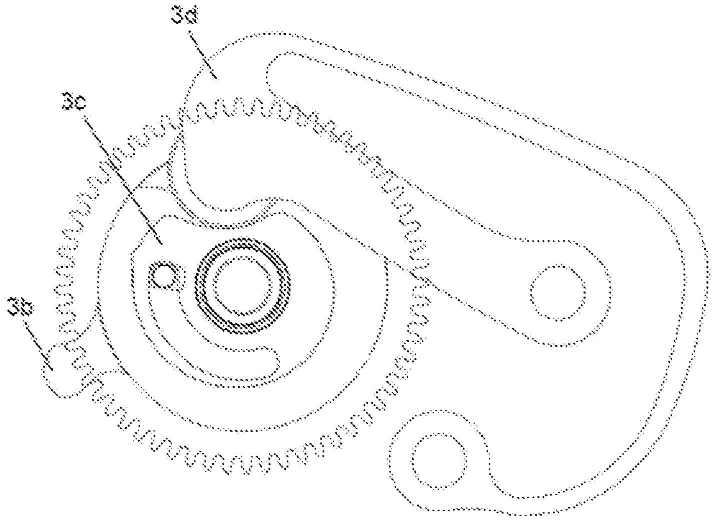
FIG. 5 is a detail view of a calendar drive device.

The calendar driver mobile 3 is preferably an instantaneous driver mobile as shown in FIG. 5. The finger 3*a*, not visible in FIG. 5, may be secured to a calendar cam 3*c* cooperating with an elastic lever 3*d*, such as that disclosed in the application WO2013102600, in order for this finger to be able to drive the first date disk 1 instantaneously through one angular step. In the same manner, the finger 3*b* may also be secured to the calendar cam 3*c* in order for that finger to be able to drive the day disk 2 instantaneously through one angular step.

Also, the energy consumption of the mobile 3 can be minimized by minimizing the respective inertias of the first and second disks 1, 2. To this end, the second disk 2 could in particular include blind openings 2*c* and/or through openings 2*d* in the plate 2*b* and/or under the face 21.

The at least one day indicator 20 preferably includes day indications shaped or presented in circular arc form.

The day indications are preferably configured to appear in a window 62 or an aperture of a dial 6 of the timepiece, which also has a circular arc geometry. This window 62 is more preferably disposed at "mid-day" or at "12 o'clock" on the dial.

The date indications are preferably configured to appear in a window 61 or an aperture of the dial 6. This window 61 is more preferably disposed at "3 o'clock" on the dial.

Note that the rotation directions of the first date disk and the second day disk about the axis A are identical in normal operation of the timepiece, that is to say upon changes of date at midnight, unlike those known in the prior art. This direction is also identical during correction phases using the correction mechanism described above. The fingers 3*a* and 3*b* of the mobile 3 are preferably elastic so as to allow correction of the calendar at any time.

There is therefore proposed in this document a timepiece calendar including at least one date or first indicator disposed in the same plane P1 or in substantially the same plane P1 as at least one day or second indicator. This enables optimization of the display quality as seen by the user. The day or second indicator is disposed at the exterior periphery of the date or first indicator so as to provide an indication of the days in full. This enables optimization of the legibility of the information displayed.

Timepiece Calendar Device

The invention concerns a timepiece calendar device. It further concerns a timepiece movement including a timepiece calendar device of this kind. It finally concerns a timepiece, in particular a wristwatch, including a timepiece calendar device of this kind or a movement of this kind.

Known for example is the Rolex 3255 movement which includes a calendar device adapted to display an indication of the day of the week and an indication of the date. A day indicator is disposed at the exterior periphery of a date indicator, so as to indicate the days in full. An arrangement of this kind requires superposition of the day and date indicators in two distinct planes. To this end the disk bearing the day indications includes windows in which the date indication may appear. A solution of this kind is very easy to read but there is a small axial offset of the day and date indications.

Also known is the ETA 2836 movement which also includes a calendar device adapted to display an indication of the day of the week and an indication of the date. The day and date indicators are disposed in one and the same plane. A disposition of this kind is nevertheless made possible by the fact that the day indicator is disposed at the interior periphery of the date indicator. A solution of this kind is not the optimum in that it is not able to provide an indication of the days in full because of the too small surface area of the day indicator, which explains the fact that here the day indication is abbreviated. Moreover, the day indication is duplicated, which can make adjustment of the day indication somewhat unergonomic.

The object of the invention is to provide a calendar device enabling improvement of the known prior art calendar devices. In particular, the invention proposes a calendar device in which the day indications in full and the date indications are easy to read and in which the quality of the display as perceived by the user is enhanced.

A calendar device according to the invention is defined by claim 1.

Various embodiments of the calendar device are defined by dependent claims 2 to 12.

A timepiece movement according to the invention is defined by claim 13.

A timepiece according to the invention is defined by claim 14.

The appended figures represent by way of example one embodiment of a timepiece.

FIG. 1 is a view of one embodiment of a timepiece.

FIG. 2 is a view of one embodiment of the calendar with the date disk removed.

FIG. 3 is a view in partial section of the embodiment of the calendar.

FIG. 4 is a detail view of a calendar correction device.

FIG. 5 is a detail view of a calendar drive device.

Figure 6:
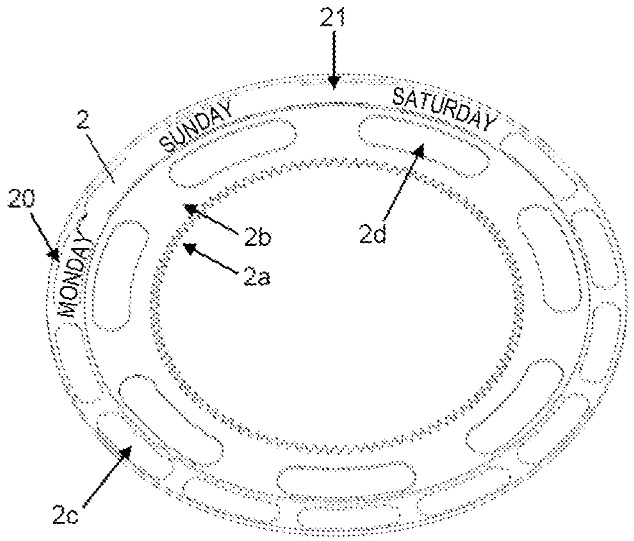
FIG. 6 is a perspective view of one embodiment of a day disk.

FIG. 6 is a perspective view of one embodiment of a day disk.

Figure 7:
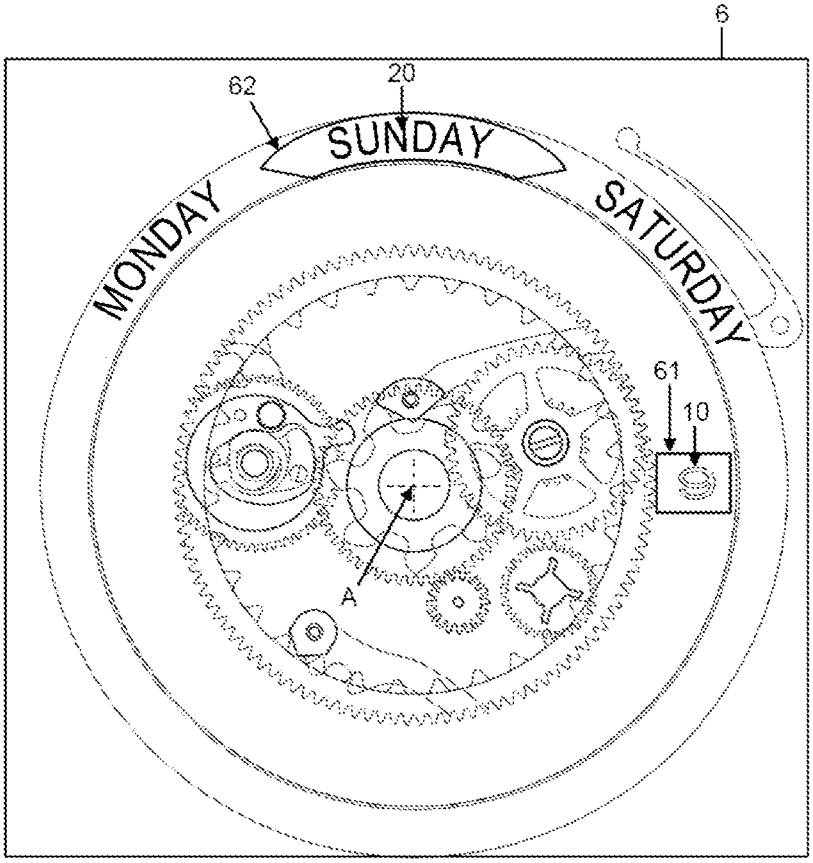
FIG. 7 is a view of one embodiment of the calendar with a dial.

FIG. 7 is a view of one embodiment of the calendar with a dial.

One embodiment of a timepiece 300 is described hereinafter with reference to FIGS. 1 to 7. The timepiece is for example a watch or a wristwatch. The timepiece includes a timepiece movement, for example an electronic or mechanical movement 200, in particular an automatic timepiece movement. The timepiece may further include a timepiece assembly, in particular a watch case intended to contain the movement.

The timepiece movement includes a calendar device 100. The timepiece calendar device includes:

- a first disk 1 for displaying dates, the first disk having a first face 11 bearing date indications 10 and being mobile about an axis A, and
- a second disk 2 for displaying days, the second disk having a second face 21 bearing day indications 20 and being mobile about the axis A.

The first and second disks are such that the first and second faces are coplanar. In other words, the date indicators or indications and the day indicators or indications are in the same plane or substantially the same plane. The first and second disks are also configured so that the second face is disposed around and outside the first face. In other words, the first face includes at least one first disk ring and the second face includes at least one second disk ring surrounding the first disk ring outside that first ring.

By "coplanar faces" we mean that the distance between the two faces or the distance measured along the axis A between two planes passing through the two faces is less than or equal to 80 μm or even less than or equal to 60 μm or even less than or equal to 40 μm.

The calendar device includes at least one first date indicator 10 that is disposed on the first disk 1. The at least one first indicator preferably includes 31 first indications. Those indications are for example numbers, in particular from 1 to 31, and are preferably disposed at a regular angular interval on the first disk around the axis A. The at least one first indicator is advantageously disposed on the first face of the first disk. The at least one first indicator may be engraved and/or pad printed on the first disk.

The calendar device includes at least one second indicator 20 of the days that is disposed on the second disk 2. The at least one second indicator preferably includes seven indications. Those seven indications are for example strings of characters, in particular strings of alphanumeric characters, in particular strings of alphabetic characters, in particular the names of the days of the week in one language or another, for example in French, in English, in Spanish, in German, in Russian, in Chinese or in Japanese. These second indications are preferably disposed at regular angular intervals on the second disk around the axis A. The at least one second indicator is advantageously disposed on the second face of the second disk. The at least one second indicator may be engraved and/or pad printed on the second disk.

The first disk 1 includes a first interior set of teeth **1*a* including 31 teeth. The first disk is angularly indexed by a beak 7*a* of a first jumper 7. This first jumper preferably cooperates with the first set of teeth 1*a* to index said disk. One of the teeth of the set of teeth 1*a* is adapted to be actuated every 24 hours by a first finger 3*a* of a calendar driver mobile 3 so as to enable driving of the first date disk 1** and therefore to enable updating of the date indication.

The calendar driver mobile 3 is also adapted to actuate a day mobile 4 that is kinematically connected to the second day disk 2. The day mobile 4 more particularly includes a first wheel 40 with an exterior set of teeth **40*a* including 7 teeth. The day mobile is angularly indexed by a beak 8*a* of a second jumper 8. One of the teeth of the set of teeth 40*a* is adapted to be actuated every 24 hours by a second finger 3*b* of the calendar driver mobile 3 so as to enable driving of the day disk 2 and therefore to enable updating of the day indication. To this end, the day mobile 4 includes a second wheel 41 constrained to rotate with the first wheel 40 which drives the day disk 2 via an intermediate mobile 5 as shown in FIG. 2. That intermediate mobile 5 includes a gear 50 with a set of teeth 50*a* adapted to mesh with the set of teeth 41*a* of the second wheel 41 and a wheel 51 with a set of teeth 51*a* adapted to drive a set of teeth 2*a* of the day disk 2**.

The day disk 2 is therefore separated from the day mobile 4 in order to establish a kinematic connection between these two elements. A design of this kind has the advantage of moving the day or second indicator to the exterior periphery of the date or first indicator whilst disposing the day or second indicator at the same level as the date or first indicator. The day or second indicator 20 is therefore disposed on the second disk 2, which has the specific feature of being actuated by a kinematic chain 4, 5 disposed between the calendar driver mobile 3 and the day disk 2.

The moduli of the sets of teeth 41*a*, 50*a*, 51*a*, 2*a* are advantageously designed to minimize as much as possible the angular play between the day mobile 4 and the day disk 2. To this end, the modulus m1 of the teeth 41*a*, 50*a* and the modulus m2 of the teeth 2*a*, 51*a* are less than 0.5, or even less than 0.3, or even less than 0.2. The moduli m1 and m2 may more particularly be between 0.07 and 0.2. As a corollary of this, the number z2 of teeth in the set of teeth 2*a* is preferably between 30 and 240, in particular between 80 and 150.

In the embodiment shown, the set of teeth 2*a* has a modulus m2 of 0.15 and includes 112 teeth.

In a complementary manner, the angular play between the mobile 4 and the disk 2 may further be minimized by means of a mobile 4 and/or a mobile 5 and/or a disk 2 taking the form of a play compensation mobile such as that forming for example the subject matter of the patent application EP1555584A1. The teeth 40*a*, 41*a*, 51*a*, 2*a* could more particularly be provided in whole or in part with elastic play compensating teeth.

The second set of teeth 2*a* of the day disk 2 is preferably an interior set of teeth. A solution of this kind enables optimum simplification of the kinematic chain disposed between the driver mobile 3 and the disk 2 whilst minimizing the total diameter of the calendar mechanism.

The day disk 2 advantageously has a shape staggered across two distinct levels. The day indicator 20 is disposed on the second face 21 passing through a first plane P1 and the set of teeth 2*a* is integrally formed with a plate 2*b* the upper surface of which extends in a second plane P2 parallel to the first plane P1. The distance between the first and second planes is equal or substantially equal to the thickness of the first disk (measured parallel to the axis A). The distance between the first and second planes is preferably between 0.1 mm and 0.3 mm, or even between 0.15 mm and 0.25 mm. The second disk therefore has a section (in a plane passing through the axis A) of L-shape or of substantially L-shape.

The first date disk 1 is preferably flat. The first disk therefore has a section (in a plane passing through the axis A) that is rectangular or substantially rectangular.

The first date disk 1 is configured to be arranged between the plate 2*b* of the second day disk 2 and a calendar bridge 91 so that the first face 11 bearing at least a date indicator 10 is disposed in the same plane P1 as the second face 21 bearing the at least one day indicator 20.

FIG. 3 shows a view of the calendar device 100 in section in a plane passing through the axis A. The axial shake (along the axis A) of the first date disk 1 is advantageously defined by the calendar bridge 91 and a calendar circle 90, in particular a first bearing surface 90*a* of the calendar bridge. The axial shake (along the axis A) of the second day disk 2 is for its part defined by calendar keys 92 disposed on the calendar circle 90 and by a second bearing surface 90*b* of the calendar circle 90. The axial shake of the date disk can therefore be defined independently of the axial shake of the day disk and vice versa. Of course, any other element may be envisaged for participating in the definition of the respective axial shakes of the day and date disks. For example, the calendar bridge 91 may be replaced by calendar keys or by the dial of the timepiece integrating the calendar mechanism. In the same manner, the calendar keys 92 may be replaced by a calendar bridge or by the dial of the timepiece integrating the calendar mechanism.

As shown in FIG. 4, the second set of teeth 2*a* of the day disk 2 has a tip diameter d2 strictly greater than the tip diameter d1 of the set of teeth 1*a* of the date disk 1. In fact, such dimensions enable implementation of a mechanism 39 for rapid correction of the calendar such as that shown in FIG. 4. This mechanism 39 for rapid correction of the calendar includes a correction mobile 30 disposed at least essentially inside the perimeter defined by the diameter d1. The correction mobile may in particular include a star 31 intersecting the plane P2 but adapted to actuate directly the set of teeth 1*a* of the first date disk 1 with no risk of interfering with the set of teeth 2*a* of the second day disk 2. To this end, the root diameter of the first set of teeth 1*a* is preferably less than the tip diameter d2 of the second set of teeth.

Preferably d2>d1 or d2>1.1×d1. In the embodiment shown d2 is equal or substantially equal to 1.2×d1.

The correction mobile 30 more preferably also includes a wheel 32 adapted to actuate the set of teeth 2*a* of the second disk 2 via the day mobile 4. The wheel 32 may more particularly be adapted to interengage with a mobile 33 meshing with the wheel 41 that is kinematically connected to the second disk 2.

The correction mobile 30 may therefore include:

a star 31 adapted to actuate directly the first set of teeth 1*a* of the first disk 1, and a wheel 32 adapted to actuate the second disk 2 via the kinematic chain 4, 5.

According to one particular mode of operation of the correction mechanism 39 the mobile 30 may be adapted:

to actuate the first date disk 1 when a correction stem is actuated in a first rotation direction, and to actuate the second day disk 2 when the correction stem is actuated in a second rotation direction opposite the first direction.

To this end, the mobile 30 can be moved in the plane of the calendar mechanism, that is to say in the plane P1 or in a plane parallel to the plane P1, by means known in the prior art, in particular the means described in the application EP2701014A1.

The calendar driver mobile 3 is preferably an instantaneous driver mobile as shown in FIG. 5. The finger 3*a*, not visible in FIG. 5, may be secured to a calendar cam 3*c* cooperating with an elastic lever 3*d*, such as that disclosed in the application WO2013102600, in order for this finger to be able to drive the first date disk 1 instantaneously through one angular step. In the same manner, the finger 3*b* may also be secured to the calendar cam 3*c* in order for that finger to be able to drive the day disk 2 instantaneously through one angular step.

Also, the energy consumption of the mobile 3 can be minimized by minimizing the respective inertias of the first and second disks 1, 2. To this end, the second disk 2 could in particular include blind openings 2*c* and/or through openings 2*d* in the plate 2*b* and/or under the face 21.

The at least one day indicator 20 preferably includes day indications shaped or presented in circular arc form.

The day indications are preferably configured to appear in a window 62 or an aperture of a dial 6 of the timepiece, which also has a circular arc geometry. This window 62 is more preferably disposed at “mid-day” or at “12 o’clock” on the dial.

The date indications are preferably configured to appear in a window 61 or an aperture of the dial 6. This window 61 is more preferably disposed at "3 o'clock" on the dial.

Note that the rotation directions of the first date disk and the second day disk about the axis A are identical in normal operation of the timepiece, that is to say upon changes of date at midnight, unlike those known in the prior art. This direction is also identical during correction phases using the correction mechanism described above. The fingers 3*a* and 3*b* of the mobile 3 are preferably elastic so as to allow correction of the calendar at any time.

There is therefore proposed in this document a timepiece calendar including at least one date or first indicator disposed in the same plane P1 or in substantially the same plane P1 as at least one day or second indicator. This enables optimization of the display quality as seen by the user. The day or second indicator is disposed at the exterior periphery of the date or first indicator so as to provide an indication of the days in full. This enables optimization of the legibility of the information displayed.

The invention claimed is:

1. A timepiece calendar device including:

a first disk for displaying dates, the first disk having a first face bearing date indications and being mobile about an axis, and a second disk for displaying days of the week, the second disk having a second face bearing day indications and being mobile about the axis, the first and second disks being arranged so that the first and second faces are coplanar, the second face being disposed around the first face, the timepiece calendar device further including a calendar driver mobile including a first finger for driving a first set of teeth of the first disk, and a second finger for driving a second set of teeth of the second disk, wherein the second set of teeth is an interior set of teeth and the first set of teeth is an interior set of teeth, the second set of teeth having a tip diameter d2 greater than the tip diameter d1 of the first set of teeth, wherein d2>1.1×d1.

2. The device as claimed in claim 1, wherein the second disk has a shape staggered across two distinct levels, day indications being disposed in a first plane, and the second set of teeth is integrally formed with a plate having an upper surface lying in a second plane parallel to the first plane.

3. The device as claimed in claim 2, wherein a distance between the first and second planes is equal or substantial equal to a thickness of the first disk.

4. The device as claimed in claim 1, further comprising a kinematic chain including a day mobile and an intermediate mobile meshing with one another, the intermediate mobile meshing with the second set of teeth of the second disk.

5. The device as claimed in claim 4, wherein at least one selected from the group consisting of:

a modulus of the teeth procuring meshing of the day mobile and the intermediate mobile is configured so as to minimize the angular play between the day mobile and the intermediate mobile, and a modulus of the set of teeth through which the intermediate mobile and the second disk mesh is configured so as to minimize the angular play between the intermediate mobile and the second disk.

6. The device as claimed in claim 2, wherein at least one selected from the group consisting of:

the day mobile and/or the intermediate mobile is/are of the play compensation type, at least one of the sets of teeth through which the intermediate mobile and the second disk mesh is of the play compensation type, and at least one of the sets of teeth through which the day mobile and the intermediate mobile mesh is of the play compensation type.

7. The device as claimed in claim 1, wherein the first disk is indexed in position by a first jumper, and the second disk is indexed in position by a second jumper.

8. The device as claimed in claim 1, including a calendar bridge and a calendar circle, and wherein at least one selected from the group consisting of:

an axial shake of the first disk is defined by the calendar bridge and the calendar circle, and an axial shake of the second disk is defined by calendar keys disposed on the calendar circle and by a second bearing surface of the calendar circle.

9. The device as claimed in claim 1, including a correction mechanism including a mobile, wherein the mobile is adapted:

to actuate the first date disk when a correction stem of a timepiece movement or timepiece is actuated in a first rotation direction, and to actuate the second day disk when the correction stem of timepiece movement or timepiece is actuated in a second rotation direction.

10. The device as claimed in claim 9, wherein the mobile includes:

a star adapted to actuate directly the first set of teeth of the first disk, and a wheel adapted to actuate the second disk via a kinematic chain.

11. A timepiece movement including a calendar device as claimed in claim 1.

12. A timepiece including a calendar device as claimed in claim 1.

13. The device as claimed in claim 1, wherein the first finger drives the first set of teeth of the first disk directly through contact of the first finger with the first set of teeth of the first disk, and wherein the second finger drives the second set of teeth of the second disk via a kinematic chain of the second set of teeth of the second disk.

14. The device as claimed in claim 3, wherein the distance between the first and second planes is in the range [0.1 mm; 0.3 mm].

15. The device as claimed in claim 6, wherein at least one of the sets of teeth through which the intermediate mobile and the second disk mesh is of the play compensation type having elastic teeth.

16. The device as claimed in claim 6, wherein at least one of the sets of teeth through which the day mobile and the intermediate mobile mesh is of the play compensation type having elastic teeth.

17. The device as claimed in claim 7, wherein the first jumper cooperates with the first set of teeth of the first disk, and/or wherein, and the second jumper cooperates with a day mobile kinematically connected to the second disk.

* * * * *